US009239980B2

United States Patent
Kovacic et al.

(10) Patent No.: US 9,239,980 B2
(45) Date of Patent: Jan. 19, 2016

(54) METHOD FOR A BATTERY AND PASSIVE POWER SUPPLY TO AN RFID TAG AND A SWITCHING CIRCUIT FOR CARRYING OUT SAID METHOD

(75) Inventors: Kosta Kovacic, Maribor (SI); Anton Pletersek, Orehova vas (SI); Andrej Vodopivec, Ljubljana (SI)

(73) Assignee: AMS R&D D.O.O., Ljubljana (SI)

( * ) Notice: Subject to any disclaimer, the term of this patent is extended or adjusted under 35 U.S.C. 154(b) by 298 days.

(21) Appl. No.: 13/139,552

(22) PCT Filed: Dec. 16, 2009

(86) PCT No.: PCT/SI2009/000066
§ 371 (c)(1),
(2), (4) Date: Jun. 14, 2011

(87) PCT Pub. No.: WO2010/071611
PCT Pub. Date: Jun. 24, 2010

(65) Prior Publication Data
US 2011/0241842 A1 Oct. 6, 2011

(30) Foreign Application Priority Data
Dec. 16, 2008 (SI) .................................. 200800309

(51) Int. Cl.
*H04Q 5/22* (2006.01)
*G06K 19/07* (2006.01)

(52) U.S. Cl.
CPC ........ *G06K 19/0723* (2013.01); *G06K 19/0702* (2013.01); *G06K 19/0707* (2013.01); *G06K 19/0712* (2013.01); *G06K 19/0717* (2013.01)

(58) Field of Classification Search
CPC  G06K 19/07; G06K 19/0707; G06K 19/0712
USPC .................... 340/7.32, 636.1, 635, 455, 93.2; 320/121
See application file for complete search history.

(56) References Cited

U.S. PATENT DOCUMENTS 4,027,228 A * 5/1977 Collins .......................... 323/282
4,692,688 A * 9/1987 Stanojevic .................... 323/285
(Continued)

FOREIGN PATENT DOCUMENTS

EP 0926623 A1 6/1999
GB 2292866 A * 3/1996 ............. G06K 19/07
(Continued)

*Primary Examiner* — Hai Phan
*Assistant Examiner* — Zhen Y Wu
(74) *Attorney, Agent, or Firm* — McDermott Will & Emery LLP

(57) ABSTRACT

A controlled switching circuit (csc) comprises two controlled switches (cs1, cs2) fabricated with PINTOS transistors and connected between its output terminal as well as a battery (b) or a rectifier rectifying voltage induced in an antenna. Conditions of the battery voltage and the rectified voltage with a time delay are checked. Only when the battery voltage gets unacceptable and the value of rectified voltage exceeded a preset value tag circuits are supplied by the rectified voltage induced in an antenna.
The invention provides for an automatic selection of a way of supplying an RFID tag in a way that it is stably supplied by a battery as far as still possible, but just according to the invention this is rendered possible for a longer time due to a very low voltage drop across a controlled switching circuit, and that a supply by a radio-frequency radiation field is selected only when the battery gets depleted.

14 Claims, 2 Drawing Sheets

(56) References Cited

U.S. PATENT DOCUMENTS

Figure 1:
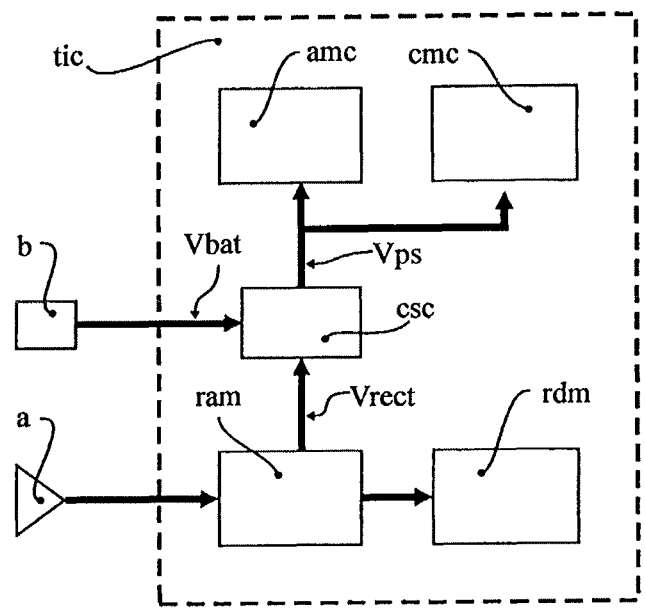

| | | | |
|---|---|---|---|
| 5,300,875 A * | 4/1994 | Tuttle | 320/138 |
| 5,463,252 A * | 10/1995 | Jones et al. | 257/723 |
| 6,160,490 A * | 12/2000 | Pace et al. | 340/7.37 |
| 6,462,647 B1 * | 10/2002 | Roz | 340/10.1 |
| 6,944,424 B2 * | 9/2005 | Heinrich et al. | 455/41.1 |
| 7,427,912 B1 * | 9/2008 | Heinrich et al. | 340/10.34 |
| 2002/0173086 A1 * | 11/2002 | Dietrich et al. | 438/151 |
| 2003/0008692 A1 * | 1/2003 | Phelan | 455/574 |
| 2003/0179626 A1 * | 9/2003 | Sanford et al. | 365/200 |
| 2004/0202900 A1 * | 10/2004 | Pavio et al. | 429/9 |
| 2005/0122651 A1 * | 6/2005 | Fischer et al. | 361/90 |
| 2006/0139005 A1 * | 6/2006 | Niculae et al. | 320/132 |
| 2007/0159329 A1 * | 7/2007 | Silverman et al. | 340/572.1 |
| 2007/0210776 A1 * | 9/2007 | Oka | 323/283 |
| 2008/0006899 A1 * | 1/2008 | Kim et al. | 257/476 |
| 2008/0087856 A1 * | 4/2008 | Wilson et al. | 251/129.03 |
| 2008/0094024 A1 * | 4/2008 | Li | 320/101 |
| 2008/0143423 A1 * | 6/2008 | Komatsu et al. | 327/534 |
| 2008/0146148 A1 * | 6/2008 | Hulvey | 455/41.1 |
| 2008/0187089 A1 * | 8/2008 | Miyayama et al. | 377/79 |
| 2008/0187821 A1 * | 8/2008 | Eickhoff et al. | 429/90 |
| 2008/0284468 A1 * | 11/2008 | Drapkin et al. | 326/80 |
| 2009/0237220 A1 * | 9/2009 | Oliver et al. | 340/10.34 |

FOREIGN PATENT DOCUMENTS

| | | |
|---|---|---|
| JP | 63-075914 | 4/1988 |
| WO | WO 01/84518 A1 | 11/2001 |
| WO | WO 2007/145911 A2 | 12/2007 |

* cited by examiner

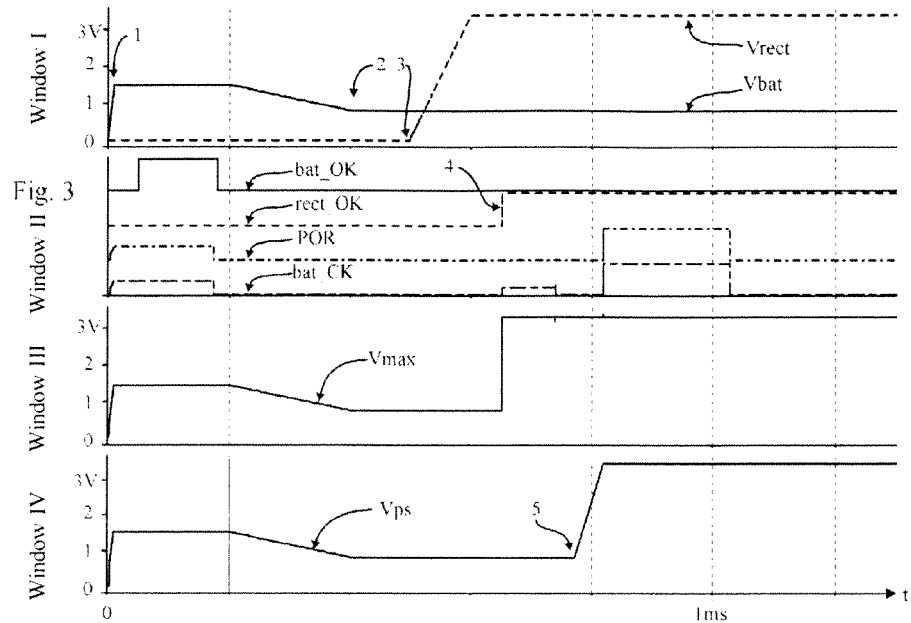
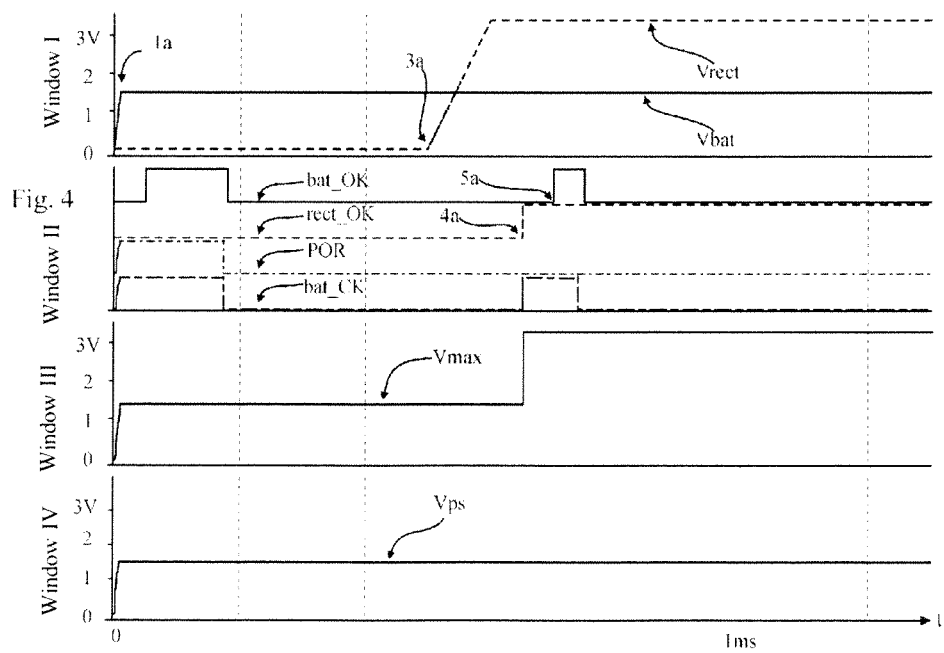

METHOD FOR A BATTERY AND PASSIVE POWER SUPPLY TO AN RFID TAG AND A SWITCHING CIRCUIT FOR CARRYING OUT SAID METHOD

This is a national stage of PCT/SI09/000066 filed Dec. 16, 2009 and published in English, which claims the priority of Slovenia number P-200800309 filed Dec. 16, 2008, hereby incorporated by reference.

The invention concerns a method for battery and passive power supply to a RFID tag, which is provided with a battery and situated in a radio-frequency radiation field, and to a switching circuit for carrying out said method. Yet the subject matter of the invention is primarily devoted to be used in RFID tags provided with one or several sensors for acquisition of magnitudes of some of the physical quantities related to a tagged article.

An RFID tag is also used to acquire magnitudes of physical quantities related to the interior or the surface of a tagged article, to acquire its temperature or illuminance, pressure or humidity, to which the article is exposed, as well as magnitudes of other physical quantities. To this purpose RFID tags are provided with one or several adequate sensors. An individual sensor can be built into an integrated circuit of the RFID tag or is an external sensor with respect to said integrated circuit of the RFID tag.

At predetermined points of time an RFID tag called data logger carries out measurement, analogue-to-digital conversion of the measuring result and stores digital data in its nonvolatile memory. A temperature history profile, for example, is very important especially during transportation and storage when the tagged article is food article, medicament, human organ and so forth.

A battery supply in such RFID tag is used for measuring, analogue-to-digital conversion, storing digital data in a nonvolatile memory as well as for reading data herefrom. Such RFID tag is discarded after the battery has been depleted and the data stored in the nonvolatile memory get lost.

There is known an RFID tag with battery power supply combined with passive supply of power, which a tag antenna picks up from the radio-frequency radiation field of an interrogator (U.S. Pat. No. 6,944,424). A capacitor as a device for energy accumulation is connected on the one hand to the battery through a first forward biased diode and on the other hand is also connected through a second forward biased diode to an output of a rectifyer rectifying the voltage induced in the antenna due to the interrogator radio-frequency radiation field. Both diodes are preferably Schottky diodes. Said combined power supply does not allow for a selection between said power sources and therefore RFID tag circuits are always supplied by the power source having higher voltage. A voltage drop across the forward biased diodes ranging from 0.2 V to 0.7 V that depends on the type of the diode and technology used for its fabrication has very adverse and sometimes even decisive effects. Ohmic voltage drop across the diode is added hereto, which depends on the diode resistance and the current therethrough.

Further an RFID tag with a sensor is known, which normally also uses power of induced voltage, but data stored in a nonvolatile memory may be lost in this RFID tag, if a battery unexpectedly gets depleted during recording a profile (WO 2007/145911 A2). Certain information can also get lost in a divided supply, wherein one part of tag circuits is supplied by the battery and the other part by induced voltage (WO 01/84518).

The problem of the invention is to suggest such method of the invention for battery and passive power supply to a RFID tag, which is provided with a battery and situated in a radio-frequency radiation field, and such controlled switching circuit for carrying out said method that power will be supplied only by the battery as long as it still has enough energy, wherein voltage drop across said controlled switching circuit during said power supply should be as negligible as possible.

Said technical problem is solved by the method for a battery power supply and passive power supply to an RFID tag and by the controlled switching circuit for carrying out said method as defined in the independent claims. Dependent claims characterize the variants of their embodiments.

The invention provides for an automatic selection of a way of supplying a RFID tag in a way that it is stably supplied by a battery as long as possible, according according to the very invention this is rendered possible for a longer time due to a very low voltage drop across a controlled switching circuit, and that a supply by a radio-frequency radiation field is selected only when the battery gets depleted.

The invention will now be explained in more detail by way of the description of an embodiment of the method of the invention for battery power supply and passive power supply to an RFID tag and of the description of an embodiment of the controlled switching circuit for carrying out said method and with reference to the accompanying drawing representing in FIG. 1 a schematic presentation of an integrated circuit of the invention of an RFID tag together with two power sources for supplying it, FIG. 2 the switching circuit of the invention for carrying out said method of the invention for the battery power supply and the passive power supply to an RFID tag, FIG. 3 for the case of the battery, which gets depleted during operation, in window I, time dependence of the battery voltage and of a rectified voltage induced in an antenna due to the interrogator radio-frequency radiation field, in window II, time dependence of individual signals, in window III, time dependence of the highest voltage at bodies of PMOS transistors of a first and a second controlled switches in the controlled switching circuit of the invention and in window IV, time dependence of a supply voltage at the output of the switching circuit of the invention, FIG. 4 as in FIG. 3, yet for the case of the battery, which retains an acceptable value of the voltage during operation.

An integrated circuit tic according to the invention of an RFID tag is schematically presented in FIG. 1 together with a battery b and an antenna a being power sources supplying it. Arrows show energy flows. The supply power is fed to a controlled switching circuit csc on the one hand by the battery b at a voltage Vbat and on the other hand by a radio analogue module ram at the voltage Vrect. Since the invention deals with a two-way supply to the RFID tag, the RFID tag is supposed to be situated in an interrogator radio-frequency radiation field, which induces voltage in the antenna a. Said voltage is rectified in the radio analogue module ram. The main part of power extracted from said radio-frequency radiation field is fed to the controlled switching circuit csc and a part of said extracted power is fed to a radio digital module rdm.

The energy flow at the supply voltage Vps from an output ps (FIG. 2) of the controlled switching circuit csc is fed to an analogue measuring circuit amc comprising, among other things, also one or several sensors, and to a control and memory circuit cmc.

A method of the invention for battery and passive power supply to an RFID tag, provided by a battery and situated in the interrogator radio-frequency radiation field is carried out in the following way.

A value of the battery voltage Vbat is checked whenever the battery b is connected to the integrated circuit tic of the RFID tag or the rectified voltage Vrect induced in the antenna a due to the radio-frequency radiation field reaching a preset value. Then a battery type (1.5 V or 3 V) is determined at the same time as well and a sensor circuit is adjusted.

In case of an acceptable value of the battery voltage Vbat, the analogue measuring circuit amc and the control and memory circuit cmc in the RFID tag are supplied through the controlled switching circuit csc by the battery b. The instantaneous battery voltage Vbat drops across the controlled switching circuit csc by a voltage drop across an open PMOS transistor in the amount of several millivolts; said circuits amc and cmc are fed at the supply voltage Vps determined as mentioned here.

In case of an unacceptable value of the battery voltage Vbat and after a termination of a time delay after the rectified voltage Vrect obtained by rectifying the voltage induced in the antenna a due to the radio-frequency radiation field exceeding the preset value, said circuits amc and cmc of the RFID tag start energizing by a rectifier (not shown) rectifying said induced voltage and being contained in the radio analogue module ram through the controlled switching circuit csc. The instantaneous voltage Vrect at a rectifier output also drops across the controlled switching circuit csc by the voltage drop across the open PMOS transistor in the amount of several millivolts; in this case said circuits amc and cmc are fed at the supply voltage Vps determined as mentioned here.

Said time delay is selected to range from 5 microseconds to 500 microseconds. When selecting said time delay it should be considered that switching performed within a short switching time consumes more energy. The most adequate time delay turns out to range from 10 microseconds to 100 microseconds.

Figure 2:
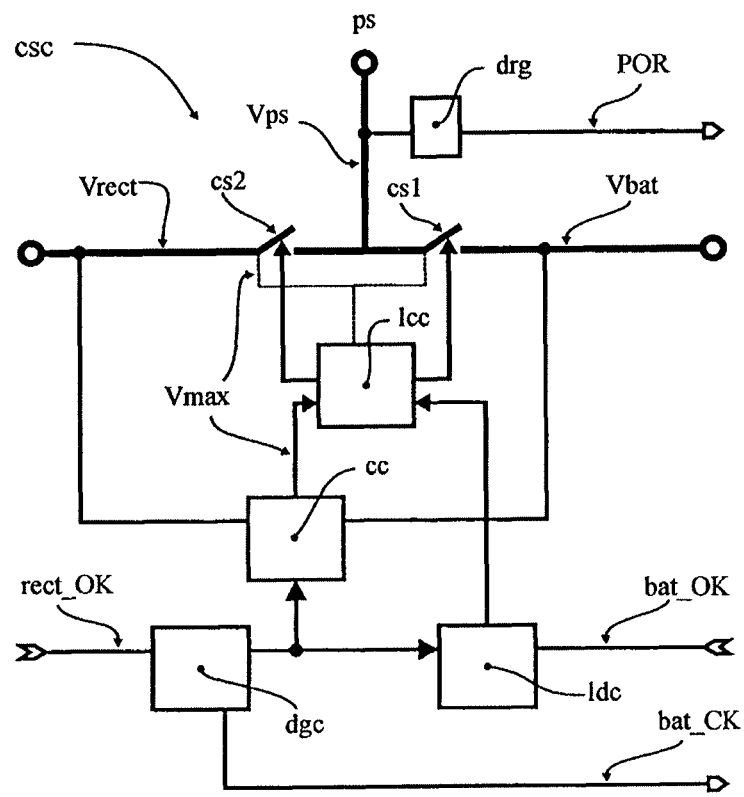

The controlled switching circuit csc of the invention for battery power supply and passive power supply to the RFID tag provided with the battery b and situated in the radio-frequency radiation field of the interrogator, is made up in the following way (FIG. 2).

The controlled switching circuit csc of the invention comprises a first controlled switch cs1, which is fabricated with a first PMOS transistor. A first terminal of the first controlled switch cs1 is connected to the supply battery b and its second terminal is connected to the output terminal ps of the controlled switching circuit csc.

The controlled switching circuit csc of the invention also comprises a second controlled switch cs2, which is fabricated with a second PMOS transistor. A first terminal of the second controlled switch cs2 is connected to a rectifier output terminal with the rectified voltage Vrect induced in the antenna a due to the radio-frequency radiation field and its second terminal of the second controlled switch cs2 is connected to the output terminal ps of the controlled switching circuit csc.

The supply voltage Vps at the output terminal ps of the controlled switching circuit csc is, depending on conditions, equal either to the instantaneous battery voltage Vbat reduced by the voltage drop across the open PMOS transistor or to the instantaneous voltage Vrect at the output terminal of said rectifier reduced by the voltage drop across the open PMOS transistor. Therefore as wide PMOS transistors as possible are used in order to keep said voltage drop as low as possible.

A signal bat_OK indicating good condition of said battery voltage Vbat and a signal rect_OK indicating good condition of said rectified voltage Vrect and being time-delayed as already mentioned are conducted to a logic decision circuit ldc within a logic control circuit lcc. The logic decision circuit ldc can make a decision only after the two input signals got stabilized. However, it should not be forgotten that more energy is used for a faster stabilization of the integrated circuit tic of the RFID tag.

An output signal of the logic decision circuit ldc either triggers a signal to close the first controlled switch cs1 and a signal to open the second controlled switch cs2, when the value of said battery voltage Vbat is acceptable, or triggers a signal to open the first controlled switch cs1 and a signal to close the second controlled switch cs2, when the value of said battery voltage Vbat is no more acceptable and the value of said rectified voltage Vrect has already reached the preset value.

A comparator circuit cc selects the higher of the battery voltage Vbat and said rectified voltage Vrect. Said higher voltage is the highest voltage Vmax in the controlled switching circuit csc and is conducted through the logic control circuit lcc to bodies of the PMOS transistors of said first and second controlled switches cs1, cs2. A proper operation of said switches is thus ensured. The body of the PMOS transistors namely has to be controlled with the highest voltage in the circuit in order to prevent an activation of any parasitic semiconductor structure.

A dynamic-reset generator drg is connected to the output terminal ps of the controlled switching circuit csc. A dynamic-reset signal POR is generated when the battery b is connected or when a sufficiently strong radio-frequency radiation field is set up, yet the battery b is depleted.

Time developments of the battery voltage Vbat, the rectified induced voltage Vrect, the highest voltage Vmax at the bodies of the PMOS transistors being said first and second controlled switches cs1, cs2, of the supply voltage Vps at the output of the controlled switching circuit csc of the invention and the signals bat_CK, rect_OK, bat_OK and POR are represented by graphs in windows I to IV in FIG. 3 for the case when the battery b gets depleted during operation.

The battery b is connected at a time moment 1. The signal bat_CK for checking the battery voltage and the dynamic-reset signal POR are generated and the signal bat_OK follows indicating good condition of the battery b.

The highest voltage Vmax at the bodies of the PMOS transistors being said first and second controlled switches cs1, cs2 is then the battery voltage Vbat. The supply voltage Vps at the output of the controlled switching circuit csc of the invention is the instantaneous battery voltage Vbat reduced by the voltage drop across the open PMOS transistor, in fact even after a time moment 2 when the battery voltage Vbat has already decreased below the allowed value and the radio-frequency radiation field has not yet been set up.

The radio-frequency radiation field is set up at a time moment 3; then the rectified induced voltage Vrect starts increasing and some time thereafter at a time moment 4 when it has reached the preset value the signal rect_OK and thereafter also the signal bat_CK for checking the battery voltage Vbat appear. A confirmation of battery condition follows. But since said battery condition is unacceptable, the signal bat_OK does not change into a high state.

The rectified induced voltage Vrect at the time moment 4 immediately became the highest voltage Vmax at the bodies of the PMOS transistors being said first and second controlled switches cs1, cs2.

The rectified induced voltage Vrect reduced by the voltage drop across the open PMOS transistor appears at a time moment 5 as the supply voltage Vps with said time delay after the time moment 4. Therefore the control and memory circuit cmc in the RFID tag is supplied. The data from the nonvolatile memory can be read despite the depleted battery b. The controlled switching circuit csc of the invention namely automatically selected supply by the radio-frequency radiation field.

Events at time moments 1a, 3a and 4a in FIG. 4 representing the same voltages and signals as FIG. 3, yet for the case when the battery b is not depleted during operation, correspond to the events in the time moments 1, 3 and 4. Yet in a time moment 5a follows a confirmation of good battery condition and for this reason the signal bat_OK now changes into a high state. As a consequence, the instantaneous battery voltage Vbat reduced by the voltage drop across the open PMOS transistor continues to be the supply voltage Vps.

The controlled switching circuit csc according to the invention automatically selected the battery power supply despite the presence of a strong enough radio-frequency radiation field. The battery power supply is namely more stable because it does not depend on various circumstances. And a considerably low voltage drop across the open PMOS transistor makes it possible that the battery voltage Vbat can be assessed for a longer time as being in good condition and used for supplying the RFID tag.

The invention claimed is:

1. A method for battery power supply and passive power supply to an RFID tag, which is provided with a battery and situated in a radio-frequency radiation field, the method characterized in that the RFID tag comprises a control and memory circuit, and an analog measuring circuit having a sensor, wherein the control and memory circuit and the analog measuring circuit are energized with a battery voltage of the battery and switched to being energized with a rectified voltage obtained by rectifying a voltage induced in an antenna due to the radio-frequency radiation field only when the battery voltage has an unacceptable value and the rectified voltage has reached a preset value, that a value of the battery voltage is checked in response to a signal generated for checking the battery voltage, whenever the battery is connected, or in response to a signal generated by a delay circuit for checking the battery voltage, whenever the rectified voltage reaches the preset value, that, in case of an acceptable value of the battery voltage, the control and memory circuit and the analog measuring circuit which are coupled to an output terminal of a controlled switching circuit are energized by the battery through the controlled switching circuit, wherein the controlled switching circuit comprises a first controlled switch fabricated with a first PMOS transistor and a second controlled switch fabricated with a second PMOS transistor, across which the battery voltage drops by a voltage drop across the conducting first PMOS transistor, that, in case of an unacceptable value of the battery voltage and after a termination of a time delay after the rectified voltage exceeded the preset value, the control and memory circuit and the analog measuring circuit are energized by a rectifier rectifying said induced voltage through the controlled switching circuit, across which the output voltage of said rectifier drop by a voltage drop across the conducting second PMOS transistor, that a signal indicating good condition of said battery voltage and a signal indicating good condition of said rectified voltage which is time-delayed by the delay circuit are conducted to a logic decision circuit, and that an output signal of the logic decision circuit either triggers a signal to close the first controlled switch and a signal to open the second controlled switch, when the value of said battery voltage corresponds to said acceptable value, or triggers a signal to open the first controlled switch and a signal to close the second controlled switch, when the value of said battery voltage corresponds to said unacceptable value and the value of said rectified voltage has already reached the preset value, and wherein a comparator circuit selects a higher voltage between the battery voltage and said rectified voltage and said higher voltage being the highest voltage in the controlled switching circuit is conducted through a logic control circuit to bodies of the PMOS transistors of said first and second controlled switches.

2. The method as recited in claim 1, characterized in that said time delay extends between 5 microseconds and 500 microseconds.

3. The method as recited in claim 1, characterized in that said time delay extends between 10 microseconds and 100 microseconds.

4. The method as recited in claim 2, characterized in that said voltage drop across the conducting first PMOS transistor and across the conducting second PMOS transistor amounts to several millivolts.

5. A switching circuit for battery power supply and passive power supply to an RFID tag, which is provided with a battery and situated in a radio-frequency radiation field, the RFID tag comprising a control and memory circuit, and an analog measuring circuit having a sensor, and wherein the switching circuit is configured to energize the control and memory circuit and the analog measuring circuit with a battery voltage of the battery and is configured to switch to energize the control and memory circuit and the analog measuring circuit with a rectified voltage obtained by rectifying a voltage induced in an antenna due to the radio-frequency radiation field only when the battery voltage has an unacceptable value and the rectified voltage has reached a preset value, the switching circuit comprising:

a first controlled switch, which is fabricated with a first PMOS transistor and whose first terminal is connected to the battery and whose second terminal is connected to an output terminal of a controlled switching circuit wherein a supply voltage is tapped at the output terminal, and a second controlled switch, which is fabricated with a second PMOS transistor and whose first terminal is connected to a rectifier output terminal at which the rectified voltage is tapped, and whose second terminal is connected to the output terminal of the controlled switching circuit, wherein the controlled switching circuit is coupled via its output terminal to the control and memory circuit and the analog measuring circuit, wherein a signal for checking the battery voltage is generated, when the battery is connected at a first time moment, and the signal for checking the battery is additionally generated by a delay circuit, when said rectified voltage reaches the preset value at a further time moment after the first time moment, wherein a signal indicating good condition of said battery voltage and a signal indicating good condition of said rectified voltage that is time-delayed by the delay circuit are conducted to a logic decision circuit, whose output signal causes a logic control circuit either to close the first controlled switch and to open the second controlled switch, when the value of said battery voltage corresponds to an acceptable value, or to open the first controlled switch and to close the second controlled switch, when the value of said battery voltage corresponds to an unacceptable value and the value of said rectified voltage has exceeded the preset value, and wherein a comparator circuit selects the higher voltage between the battery voltage and said rectified voltage and said higher voltage being the highest voltage in the controlled switching circuit is conducted through the logic control circuit to bodies of the PMOS transistors of said first and second controlled switches.

6. The switching circuit as recited in claim 5, characterized in that said time delay extends between 5 microseconds and 500 microseconds.

7. The switching circuit as recited in claim 5, characterized in that said time delay extends between 10 microseconds and 100 microseconds.

8. The switching circuit as recited in claim 6, characterized in that a dynamic-reset generator is connected to the output terminal of the controlled switching circuit.

9. The method as recited in claim 1, characterized in that the sensor is configured for acquisition of a magnitude of a physical quantity related to a tagged article.

10. The method as recited in claim 1, characterized in that the RFID tag is configured to carry out a measurement, to perform an analog-to-digital conversion of a measuring result, and to store digital data in a non-volatile memory of the RFID tag.

11. The switching circuit as recited in claim 5, characterized in that the sensor is configured for acquisition of a magnitude of a physical quantity related to a tagged article.

12. The switching circuit as recited in claim 5, characterized in that the RFID tag is configured to carry out a measurement, to perform an analog-to-digital conversion of a measuring result, and to store digital data in a non-volatile memory of the RFID tag.

13. A method for battery power supply and passive power supply to an RFID tag, which is provided with a battery and situated in a radio-frequency radiation field, the method characterized in that the RFID tag comprises a control and memory circuit, and an analog measuring circuit having a sensor, wherein the control and memory circuit and the analog measuring circuit are energized with a battery voltage of the battery and switched to being energized with a rectified voltage obtained by rectifying a voltage induced in an antenna due to the radio-frequency radiation field only when the battery voltage has an unacceptable value and the rectified voltage has reached a preset value, that a value of the battery voltage is checked in response to a signal generated for checking the battery voltage, whenever the battery is connected, or in response to a signal generated by a delay circuit for checking the battery voltage, whenever the rectified voltage reaches the preset value, that, in case of an acceptable value of the battery voltage, the control and memory circuit and the analog measuring circuit which are coupled to an output terminal of a controlled switching circuit are energized by the battery through the controlled switching circuit, wherein the controlled switching circuit comprises a first controlled switch fabricated with a first PMOS transistor and a second controlled switch fabricated with a second PMOS transistor, across which the battery voltage drops by a voltage drop across the conducting first PMOS transistor, that, in case of an unacceptable value of the battery voltage and after a termination of a time delay after the rectified voltage exceeded the preset value, the control and memory circuit and the analog measuring circuit are energized by a rectifier rectifying said induced voltage through the controlled switching circuit, across which the output voltage of said rectifier drop by a voltage drop across the conducting second PMOS transistor, that a signal indicating good condition of said battery voltage and a signal indicating good condition of said rectified voltage which is time-delayed by the delay circuit are conducted to a logic decision circuit, and that an output signal of the logic decision circuit either triggers a signal to close the first controlled switch and a signal to open the second controlled switch, when the value of said battery voltage corresponds to said acceptable value, or triggers a signal to open the first controlled switch and a signal to close the second controlled switch, when the value of said battery voltage corresponds to said unacceptable value and the value of said rectified voltage has already reached the preset value, wherein a comparator circuit selects a higher voltage between the battery voltage and said rectified voltage and said higher voltage being the highest voltage in the controlled switching circuit is conducted through a logic control circuit to bodies of the PMOS transistors of said first and second controlled switches, and wherein a battery type of the battery is determined and the analog measuring circuit having the sensor is adjusted at a time when the battery is connected to the RFID tag.

14. A switching circuit for battery power supply and passive power supply to an RFID tag, which is provided with a battery and situated in a radio-frequency radiation field, the RFID tag comprising a control and memory circuit, and an analog measuring circuit having a sensor, and wherein the switching circuit is configured to energize the control and memory circuit and the analog measuring circuit with a battery voltage of the battery and is configured to switch to energize the control and memory circuit and the analog measuring circuit with a rectified voltage obtained by rectifying a voltage induced in an antenna due to the radio-frequency radiation field only when the battery voltage has an unacceptable value and the rectified voltage has reached a preset value, the switching circuit comprising:

a first controlled switch, which is fabricated with a first PMOS transistor and whose first terminal is connected to the battery and whose second terminal is connected to an output terminal of a controlled switching circuit wherein a supply voltage is tapped at the output terminal, and a second controlled switch, which is fabricated with a second PMOS transistor and whose first terminal is connected to a rectifier output terminal at which the rectified voltage is tapped, and whose second terminal is connected to the output terminal of the controlled switching circuit, wherein the controlled switching circuit is coupled via its output terminal to the control and memory circuit and the analog measuring circuit, wherein a signal for checking the battery voltage is generated, when the battery is connected at a first time moment, and the signal for checking the battery is additionally generated by a delay circuit, when said rectified voltage reaches the preset value at a further time moment after the first time moment, wherein a signal indicating good condition of said battery voltage and a signal indicating good condition of said rectified voltage that is time-delayed by the delay circuit are conducted to a logic decision circuit, whose output signal causes a logic control circuit either to close the first controlled switch and to open the second controlled switch, when the value of said battery voltage corresponds to an acceptable value, or to open the first controlled switch and to close the second controlled switch, when the value of said battery voltage corresponds to an unacceptable value and the value of said rectified voltage has exceeded the preset value, wherein a comparator circuit selects the higher voltage between the battery voltage and said rectified voltage and said higher voltage being the highest voltage in the controlled switching circuit is conducted through the logic control circuit to bodies of the PMOS transistors of said first and second controlled switches, and wherein a battery type of the battery is determined and the analog measuring circuit having the sensor is adjusted at a time when the battery is connected to the RFID tag.

* * * * *